United States Patent [19]

Lin

[11] Patent Number: 4,664,213

[45] Date of Patent: May 12, 1987

[54] ALL-DIRECTION CHANGING MECHANISM PLUS A DRIVING POWER TRANSMISSION MECHANISM

[76] Inventor: Sheen T. Lin, 22, Liu-Bridge E. Rd., Kang Shan Chen, Kaohsiung Hsien, Taiwan, 820

[21] Appl. No.: 851,265

[22] Filed: Apr. 10, 1986

Related U.S. Application Data

[63] Continuation of Ser. No. 535,749, Sep. 26, 1983, abandoned.

[51] Int. Cl.⁴ .................................................. B60V 1/11
[52] U.S. Cl. ................................. 180/212; 180/89.13; 280/91; 74/496
[58] Field of Search ................... 180/210, 212, 21, 7.1, 180/89.13; 280/91, 99, 103; 74/496, 498, 424, 665 H; 212/244, 254, 265

[56] References Cited

U.S. PATENT DOCUMENTS

| | | | |
|---|---|---|---|
| 1,163,862 | 12/1915 | Schenck | 180/212 |
| 2,202,676 | 5/1940 | Townson | 280/91 X |
| 2,465,508 | 3/1949 | Barnhart | 212/254 X |
| 2,666,491 | 1/1954 | Johnson | 280/91 X |
| 2,874,792 | 2/1959 | Scheuerpflug | 280/91 X |
| 2,995,380 | 8/1961 | King | 280/91 |
| 3,016,966 | 1/1962 | Hansen | 180/210 X |
| 3,090,516 | 5/1963 | Seymour et al. | 280/91 X |
| 3,198,541 | 8/1965 | Christenson et al. | 280/91 |
| 3,480,156 | 11/1969 | Pensa | 180/89.13 X |
| 3,689,101 | 9/1972 | Spence | 180/261 |
| 4,335,626 | 6/1982 | Fisher | 74/496 |

FOREIGN PATENT DOCUMENTS

| | | | |
|---|---|---|---|
| 120574 | 7/1900 | Fed. Rep. of Germany | 212/254 |
| 384144 | 9/1921 | Fed. Rep. of Germany | 280/91 |
| 932887 | 8/1955 | Fed. Rep. of Germany | 280/91 |
| 1067475 | 10/1959 | Fed. Rep. of Germany | 280/91 |
| 1343558 | 10/1963 | France | 280/91 |
| 520727 | 3/1955 | Italy | 280/91 |
| 591741 | 4/1959 | Italy | 212/244 |
| 495224 | 3/1976 | U.S.S.R. | 280/91 |

Primary Examiner—Samuel Scott
Assistant Examiner—H. A. Odar
Attorney, Agent, or Firm—Holman & Stern

[57] ABSTRACT

An all-direction-changing mechanism and a driving power transmission mechanism combined together comprising a plurality of connecting rods radially extending from a connecting center, direction-changing cranks on the outer ends of the connecting rod controlling the direction of wheels mounted on the cranks, the ends of the connecting rods being connected with said direction-changing cranks by direction-changing crank pins, the connecting center being a center crank fastened to a steering mechanism mounted on a revolving vehicle body so that when the steering wheel is turned around for changing the vehicle's running direction, the connecting rods are also moved in parallel to one another, and as a result the vehicle body and all the wheels also change direction in the same angle. The driving power transmission mechanism is constituted by placing its axles, flat gears and bevel gears inside the direction-changing mechanism and arranging it so that every wheel receives its driving power from a chain and two chain sprockets that are revolved by a set of bevel gears one of which is mounted on a coupling rod which is rotated by the gears on the direction changing crank which receive power from gears on power transmission shafts inside the connection rods whereby all the wheels run at equal speed.

3 Claims, 9 Drawing Figures

ALL-DIRECTION CHANGING MECHANISM PLUS A DRIVING POWER TRANSMISSION MECHANISM

This is a continuation of application Ser. No. 535,749, filed Sept. 26, 1983, now abandoned.

BACKGROUND OF THE INVENTION

1. Field of the Invention

This invention relates to a new driving mechanism for an automobile.

2. Description of the Prior Art

Ordinary automobiles with four wheels can only go forward or backward. If one should go into a dead alley, it could not be driven backward without great difficulty and expert technique.

BRIEF SUMMARY OF THE INVENTION

In this invention the direction-changing mechanism for wheels has been developed to the degree that a driver can steer the vehicle equipped with this new mechanism to any angle from 0° to 36°, and all the wheels can run at equal speed.

BRIEF DESCRIPTION OF THE DRAWINGS

The invention will now be described in detail with reference to the accompanying drawings, wherein.

DETAILED DESCRIPTION OF THE PREFERRED EMBODIMENT

Figure 1:
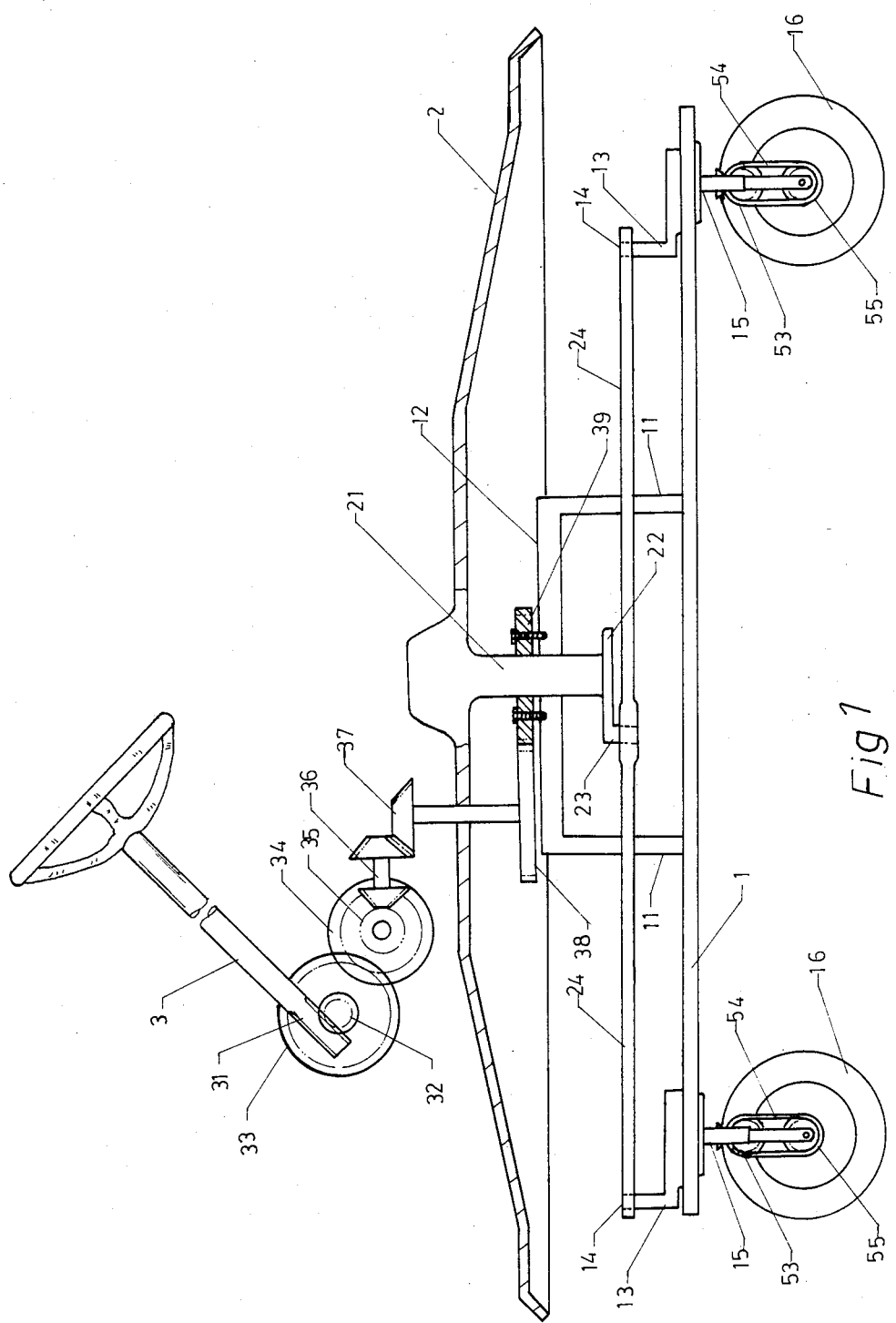
FIG. 1 is a diagrammatic cross-sectional view showing the direction-changing transmitting action of the all-direction-changing mechanism in this invention.

First, the direction-changing mechanism is described. As FIG. 1 shows, circular plate 12 is mounted on immobile base 1 with columns 11, and through the center hole of said plate 12 is placed rotating axle 21 connected with revolving vehicle body 2 which serves to keep said base 1 in its place.

Under said axle 21 at the center of said vehicle body 2 is fixed center crank 22 constituting a unit together with said axle 21 and vehicle body 2, so that this unit can move around in accordance with the turning of said axle 21 in the hole of circular plate 12.

Under one end of crank 22 extends center crank pin 23 with which are connected radially a plurality (three or more) of connecting rods 24 that are also connected with crank pins 14 at the other end.

Said immobile base 1 is constructed as a plurality of arms extending radially from its center, and each arm is equipped with an axle hole for connecting with direction-changing crank 13, which is to be connected with said connecting rod 24 by means of crank pin 14 protruding from said crank 13.

Said direction changing crank 13 forms a set of revolving devices when mounted in the axle hole of the arm of said immobile base 1, and combined with wheel 16 and two shock-absorber rods 15 mounted under said crank 13. The number of cranks 13 may be three or more, depending on practical necessity, but no matter what the number may be, all the wheels should be turned in the same direction when said cranks 13 are turned by the manipulation of the steering wheel, and the direction of all wheels are turned in the same angle as the steering wheel as well.

Figure 3:
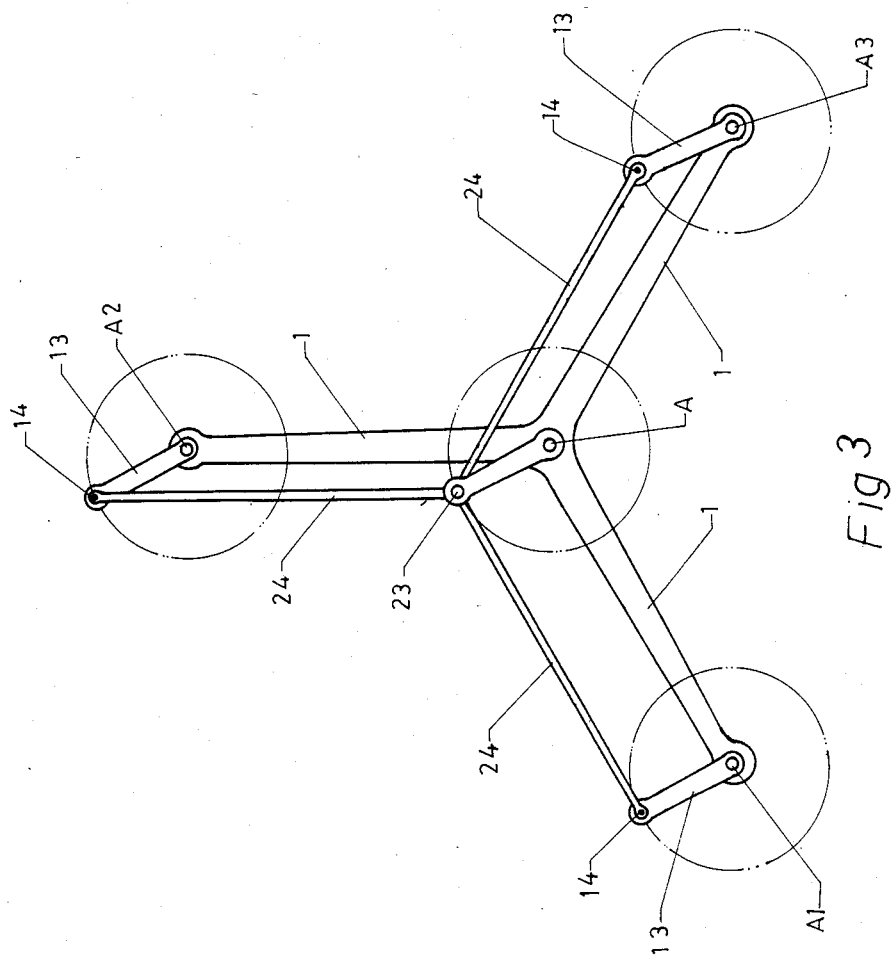
FIG. 3 is a schematic top plan view of the all-direction-changing mechanism in this invention.

FIG. 3 has been drawn to make the principle of this direction-containing mechanism understood easily. The four dashed circles in FIG. 3 represent the moving scope of said center crank 22 and of said direction-changing cranks 13. Center A of the middle circle is the central point where said revolving axle 21 of said vehicle body will turn on said base 1. Three arms extend radially from said Center A, and at each end of said arms is bored axle holes A1, A2, A3 for said direction-changing cranks 13 to be inserted into, and then said crank pins 14 of said cranks 13 should be connected with said connecting rods 24 which are connected with said center crank pin 23. Consequently, said immobile base 1 never moves but stays as it is, although said center crank 22 may be turned around according to the dashed circle of Center A by manipulation of the steering wheel, and this is the principle by which said vehicle body 2 can be kept in the same direction as its wheels 16.

The manner in which the center crank 22 is moved will be explained by reference FIG. 1. Whenever steering-wheel axle 3 is turned, worm 31 engaging with worm wheel 32 turns said worm wheel 32, and this turning movement is transmitted in turn to gears 33, 34, 35, 36, 37 with the result that planetary gear 38 mounted under said vehicle body 2 moves around sun gear 39 fixed with said circular plate 12, enabling said vehicle body 2 to turn around in the same angle as said center crank 22 and crank pin 23.

Figure 2:
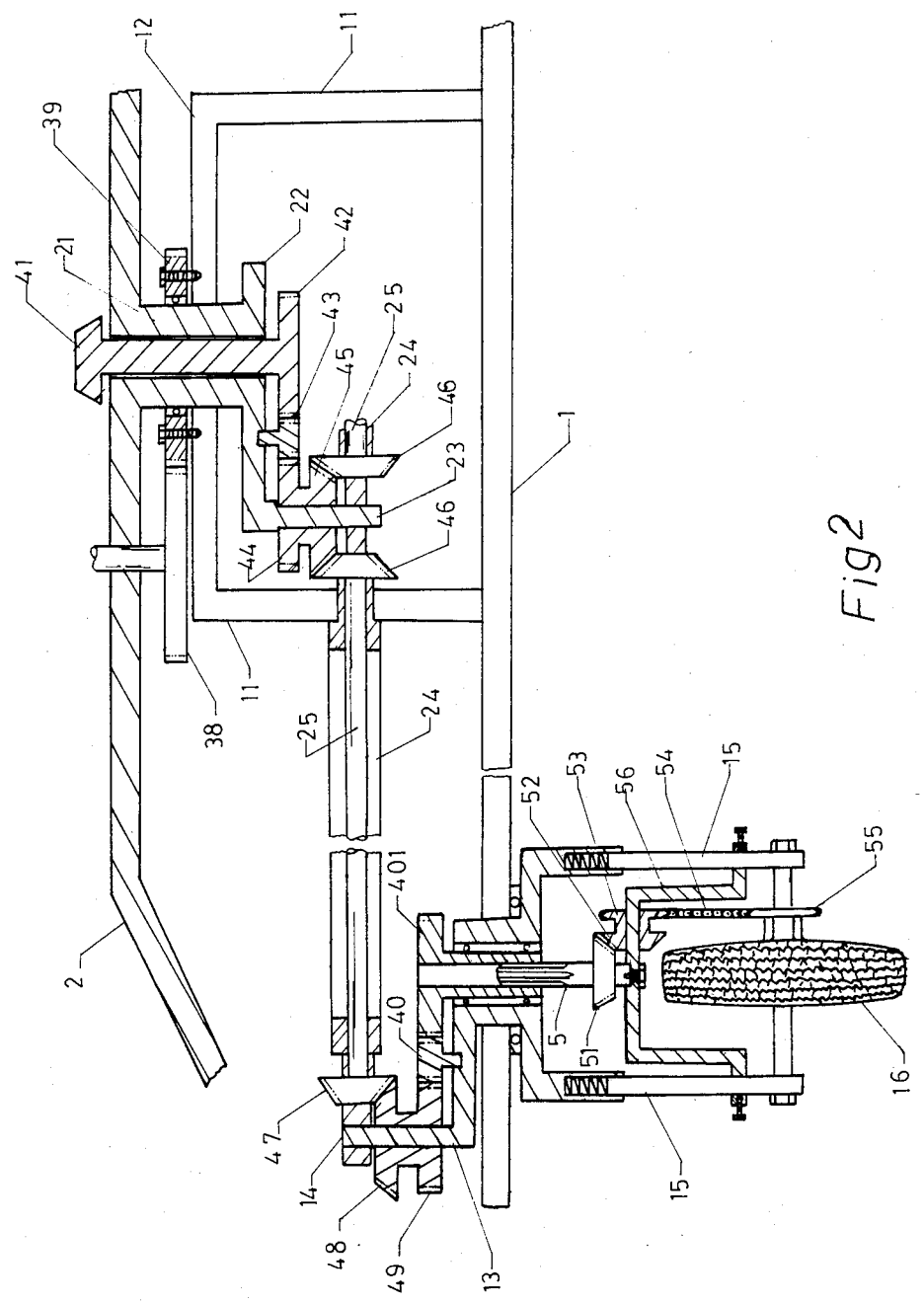
FIG. 2 is a cross-sectional view of the all-direction-changing mechanism combined with the driving power transmission mechanism in this invention.
Figure 4:
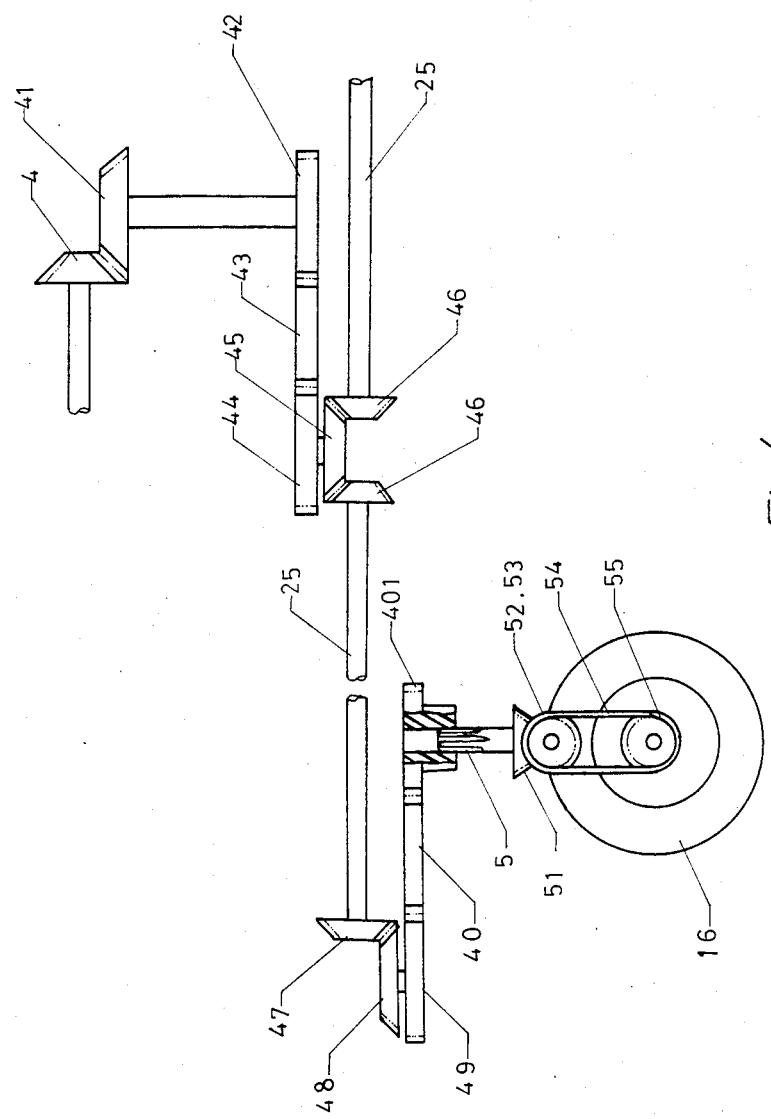
FIG. 4 is a schematic elevational view of the transmitting action of the driving power transmission mechanism in this invention.

Next, this equal-pace driving mechanism is to be described as follows with reference to FIGS. 2 & 4. After driving power has been generated, it is to be transmitted to power gear 4 which turns main gear 41 mounted inside said revolving axle 21. As said main gear 41 is axially connected with gear 42 which turns gear 43, and then said gear 43 turns gear 44 mounted an said crank pin 23 and gear 45 axially connected with said gear 44. Gears 46, axially fixed an power transmission shaft 25 mounted inside each of said connecting rods 24, engages with gear 45 to transmit driving power to bevel gear 47 engaging bevel gear 48 axially mounted an crank pin 13, and then to flat gears 49, 40, 401 having a transmission ratio of 1:1.

Flat gear 401 is mounted in a bearing fixed in the axle hole in said direction-changing crank 13. At the center of said flat gear 401 is bored a coupling hole to receive therein coupling rod 5 which axially connects with bevel gear 51.

Said coupling rod 5 not only can move up and down in said coupling hole but also is fastened to adjusting frame 56 with which bevel gear 52 and chain sprocket 53 as one unit are axially connected.

Chain 54 transmits driving power from sprocket 53 to sprocket 55 which in turn transmits the revolving movement to wheel 16 axially connected with sprocket 55 through the wheel axle.

Both said adjusting frame 56 and the axle for fastening wheel 16 are fixed with and suspended by a pair of shock-absorber rods 15. The tightness of chain 54 running around said two sprockets 53, 55 can be adjusted properly by moving up or down the adjusting frame 56.

When wheels 16 run on an uneven rough road, coupling rods 5 and shock-absorber rods 15 can move up or down at the same time, without interrupting the transmission of driving power. When this vehicle is changing its direction while driving, all the wheels can run with equal speed because the position of said center crank pin and said direction-changing pins axially connected on said connecting rods face each other the latter down, the former up.

Figure 5:
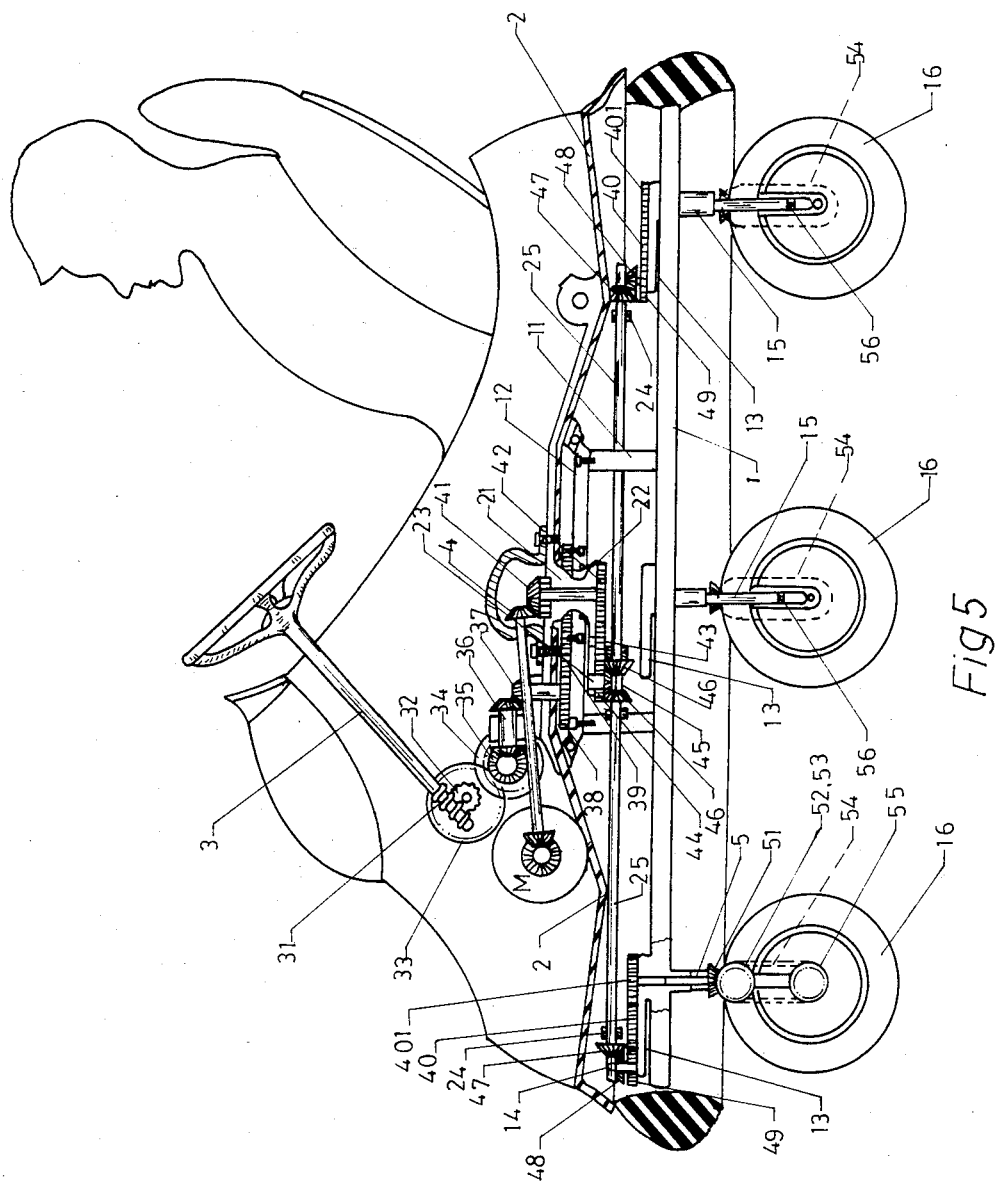
FIG. 5 is a partial cross-sectional view of a vehicle equipped with this all-direction-changing mechanism plus the driving power transmission mechanism.
Figure 6:
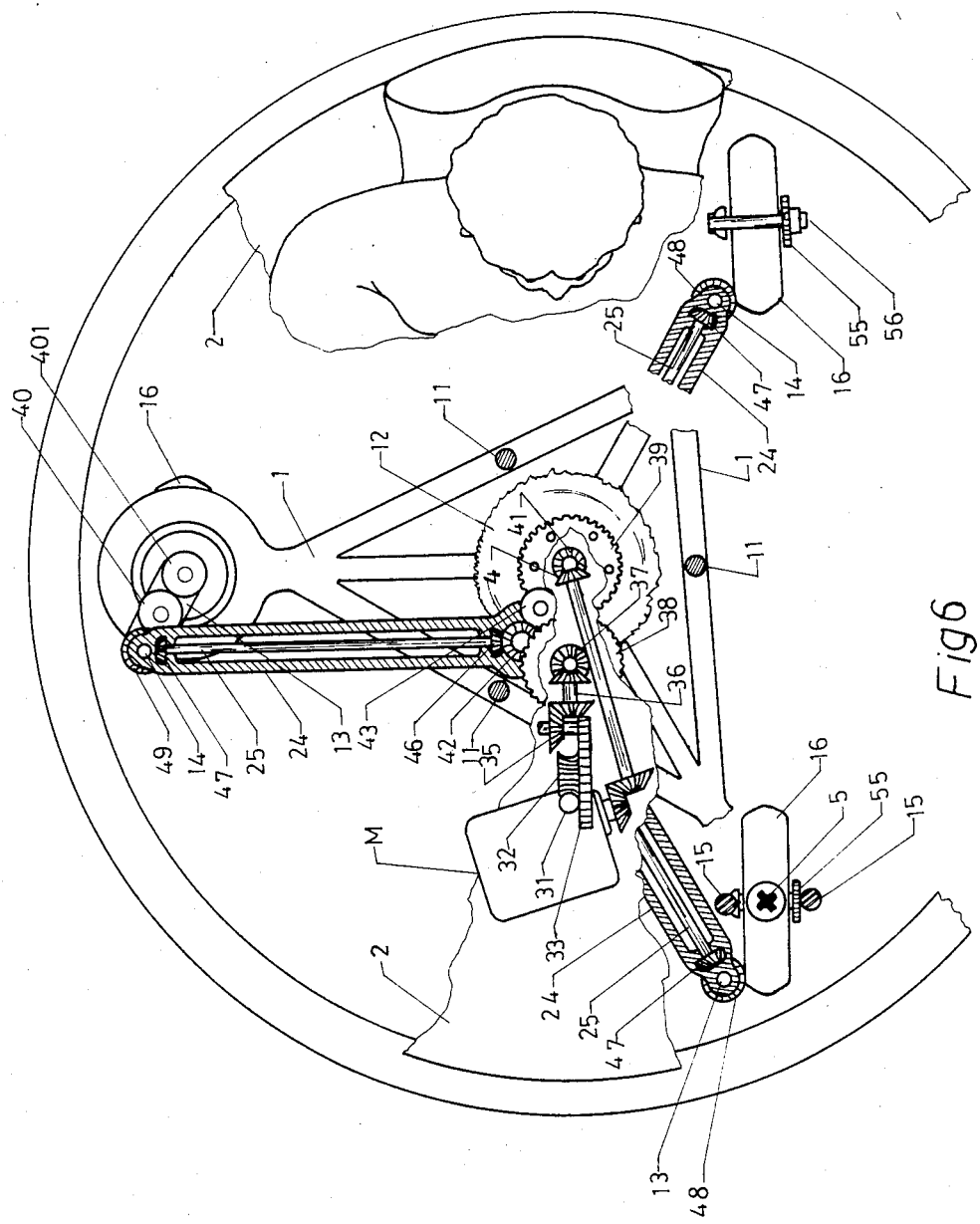
FIG. 6 is a partial cross-sectional and cut-away top plan view of a vehicle equipped with this all-direction-changing mechanism plus the driving power transmission mechanism.
Figure 7:
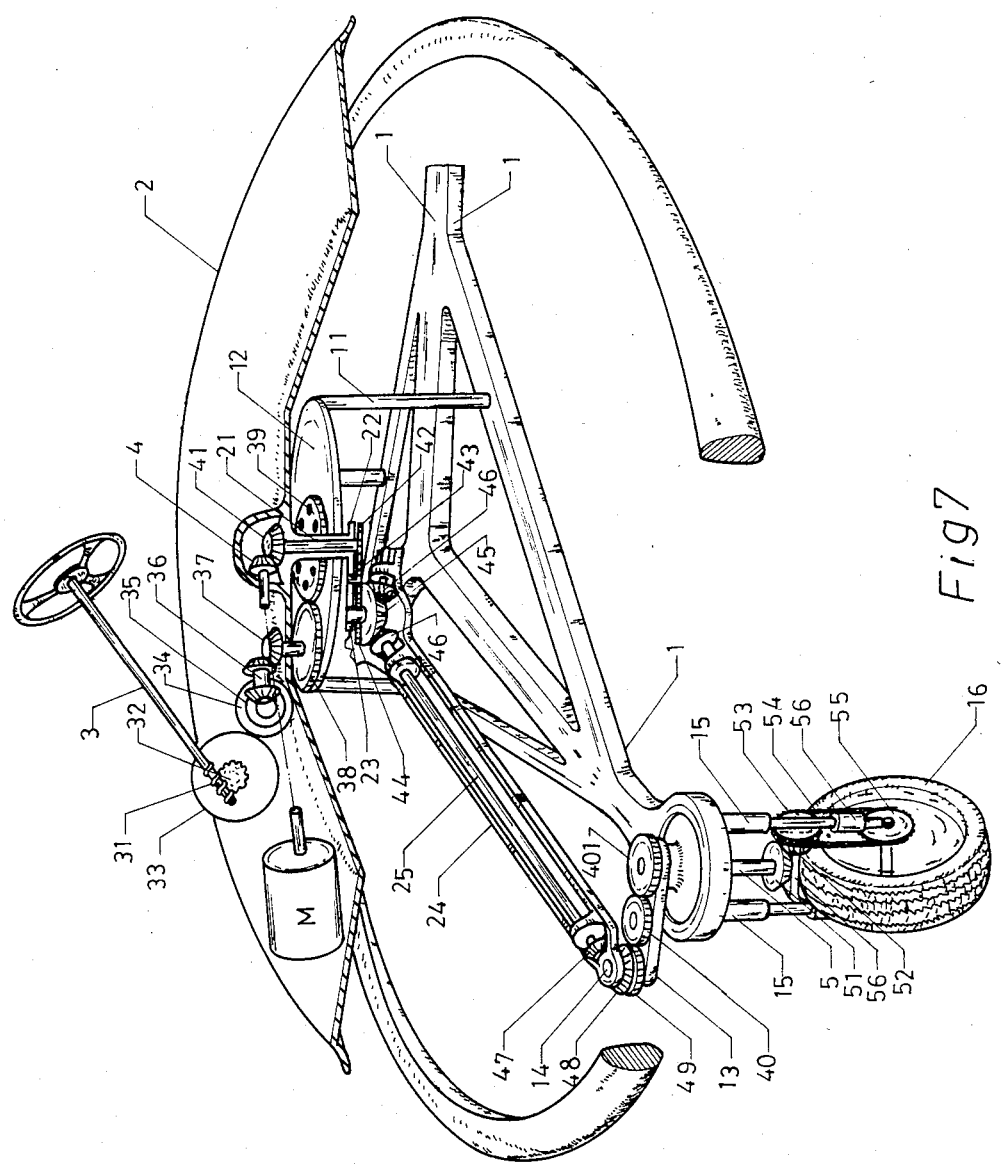
FIG. 7 is a perspective part cut-away view of a vehicle equipped with this all-direction changing mechanism plus the driving power transmission mechanism.
Figure 8:
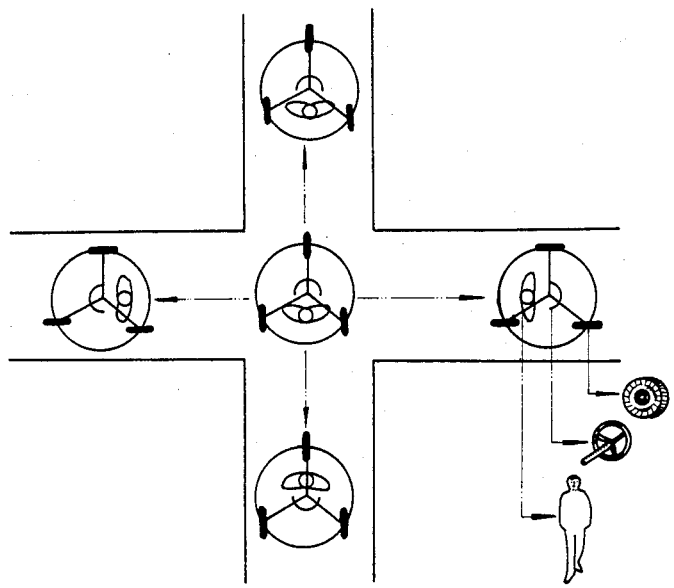
FIG. 8 is a diagram showing the wheels changing direction in changing the right angle direction of the vehicle in this invention.
Figure 9:
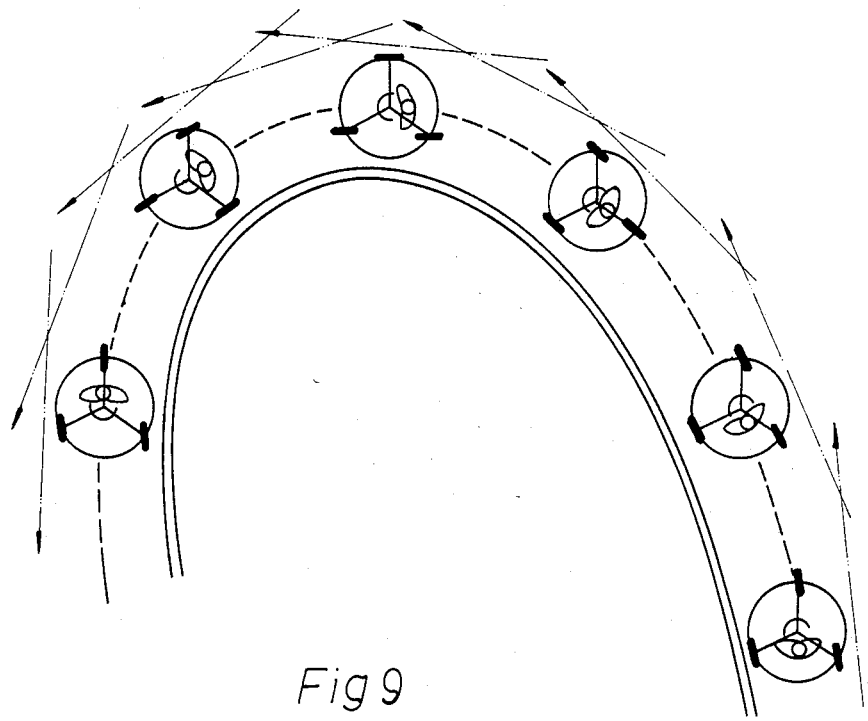
FIG. 9 is a diagram showing the wheels running direction in changing the running direction around a curve vehicle in this invention.

Now it can be easily realized, after the above description about the direction-changing mechanism and the equal-speed driving transmission mechanism, that these two mechanisms can be utilized independently or combined together. FIGS. 5, 6 & 7 show that a vehicle equipped with said two mechanisms can satisfy the purpose of this invention, and FIGS. 8 & 9 show that no matter what direction this vehicle may turn to, its immobile base 1 is bound to keep its original position, with its revolving vehicle body and its wheels to be changed to any direction with the equal-speed movement.

I claim:

1. A steering mechanism for a vehicle comprising:
   a base member;
   a plurality of column members extending upwardly from said base member;
   a circular plate mounted on said column members and having an upper surface;
   a hole through said circular plate;
   a vehicle body support axle having an upper end and a lower end and rotatably mounted in said hole and extending vertically through said hole;
   a vehicle body supported on the upper end of said axle above said circular plate;
   a sun gear mounted on said circular plate adjacent the upper surface of said circular plate between said circular plate and said vehicle body and coaxially and rotatably with respect to said axle;
   a planetary gear operatively engaging said sun gear;
   a vertical planetary gear shaft coaxially connected to said planetary gear extending through a part of said vehicle body radially spaced outwardly from said axle;
   a steering wheel and steering wheel mechanism operatively connected to said planetary gear shaft to rotate said shaft by rotation of the steering wheel causing said planetary gear to revolve around said sun gear and rotate said vehicle body with respect to said base about the axis of said axle;
   a center crank arm extending radially from said axle below said circular plate;
   a center crank pin extending vertically from said center crank arm and radially spaced from the central axis of said axle;
   at least three wheel support means rotatably mounted on said base member for rotation about vertical axes in spaced relationship and radially spaced with respect to
   a wheel rotatably mounted on each wheel support means;
   a wheel support crank arm for each wheel support means operatively connected to a respective wheel support means to rotate with said respective wheel support means;
   a vertically extending crank pin on each wheel support crank arm;
   and a connecting rod for each wheel pivotably connected at one end to each crank pin and pivotally connected at the other end to said center crank pin;
   so that turning the steering wheel turns each wheel and vehicle body simultaneously in the same rotational direction through the same angle with respect to said base member.

2. A mechanism as claimed in claim 1 and further comprising:
   a power generating mechanism operatively mounted on said vehicle body having an output shaft;
   a drive shaft rotatably mounted in and coaxially extending through said axle;
   a driving gear mechanism operatively connected between said output shaft and said drive shaft to rotate said drive shaft by said power generating mechanism;
   a drive gear on said axle below said central crank arm;
   a drive rod rotatably mounted on and extending along and substantially within each connecting rod;
   an inner bevel gear mounted on the inner end of each drive rod adjacent said enter crank pin;
   an inner gear mechanism mounted on said center crank pin and center crank arm operatively connecting said drive gear to said inner bevel gears to rotate said drive rods by rotation of said drive gear;
   a bevel gear on the outer end of each drive rod adjacent said wheel support crank pin;
   an outer gear mechanism mounted on each wheel support crank pin and wheel support crank arm;
   an outer drive shaft extending vertically and rotatably mounted in each wheel support means;
   a gear on each outer drive shaft operatively engaging a respective outer gear mechanism;
   a bevel gear on the lower end of each outer drive shaft;
   a bevel gear and chain sprocket member rotatably mounted on each wheel support means operatively engaging a respective outer drive shaft bevel gear;
   a wheel axle rotatably supporting each wheel on a respective wheel support means;
   a wheel drive sprocket operatively mounted on each wheel support means to rotate a respective wheel; and
   a chain operatively connecting said sprockets on each wheel support means so that operation of said power generating mechanism drives said wheels simultaneously at the same speed.

3. A steering mechanism as claimed in claim 1 and further comprising: shock absorber means operatively mounted on said wheel support means to absorb shock on said wheels.

* * * * *